Nov. 7, 1967   R. C. OLSEN ET AL   3,351,939
PULSE REPETITION INTERVAL CORRELATION DETECTOR
Filed Feb. 24, 1966   2 Sheets-Sheet 1
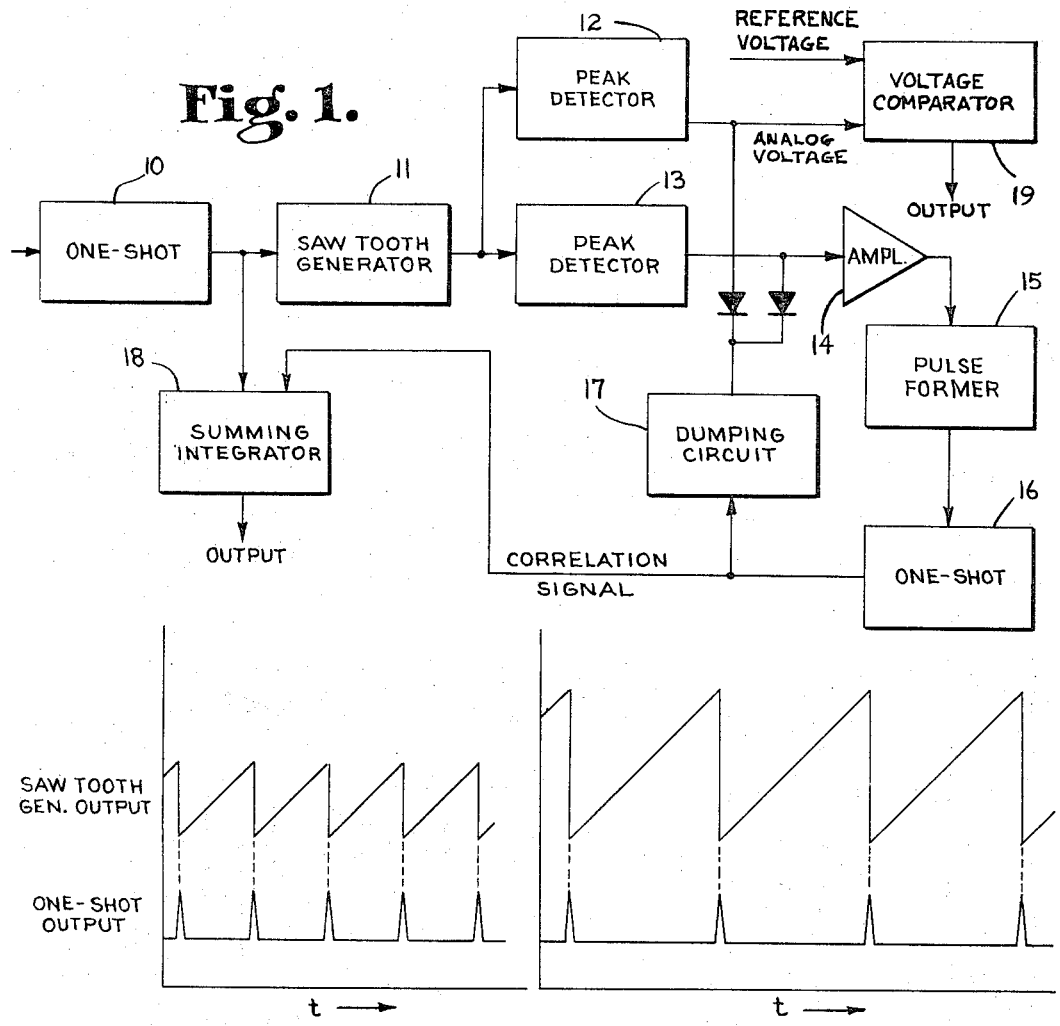
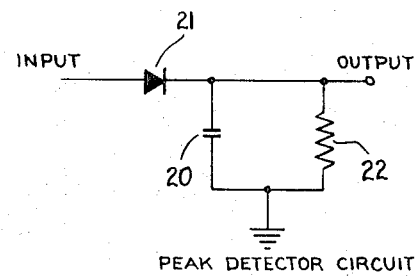
INVENTOR.
ROBERT C. OLSEN and
FREDERICK O. STAHLHUT
BY
H. H. Loucks
ATT'YS.

Nov. 7, 1967   R. C. OLSEN ET AL   3,351,939
PULSE REPETITION INTERVAL CORRELATION DETECTOR
Filed Feb. 24, 1966   2 Sheets-Sheet 2

INVENTOR.
ROBERT C. OLSEN and
FREDERICK O. STAHLHUT

H. H. Loeschke
ATT'YS.

United States Patent Office 3,351,939
Patented Nov. 7, 1967

3,351,939
PULSE REPETITION INTERVAL CORRELATION
DETECTOR
Robert C. Olsen and Frederick O. Stahlhut, Indianapolis, Ind., assignors to the United States of America as represented by the Secretary of the Navy
Filed Feb. 24, 1966, Ser. No. 531,637
3 Claims. (Cl. 343—17.1)

ABSTRACT OF THE DISCLOSURE

A radar receiver correlation detector for discriminating and detecting the shortest single pulse repetition interval (PRI), which normally can be identified with a specific emitting source, within a multisignal environment of unsynchronized pulse repetition frequencies (PRF's). All received pulses from a multisignal environment are applied to a one-short pulse width equalizer having two outputs, one to a reference channel and the other to a correlation channel. The correlation channel includes a monostable sawtooth generator which develops an output voltage whose peak amplitude is proportional to the time interval between successive pulses. This sawtooth signal charges a peak detector circuit whose output is coupled via a pulse former and a one-shot multivibrator to a summing integrator which also receives the reference channel output from the pulse width equalizer. The summing integrator produces a D.C. level output signal which may be used for video gating or other applications within the radar system only if there is complete correlation of the pulses from the reference and correlation channels over a period of time, which may be adjusted by varying resistance and capacitance values within the integrator, equivalent to several pulses from the reference channel.

The invention described herein may be manufactured and used by or for the Government of the United States of America for governmental purposes without the payment of any royalties thereon or therefor.

Background of the invention

This invention relates to a pulse repetition interval (PRI) detector, and more particularly to an effective means of detecting the signal of highest pulse repetition frequency (PRF), or shortest pulse repetition interval (PRI), from a train of pulses in a multisignal environment.

It has become necessary in some military work to single out one PRF, emanating from an area where several radars are transmitting. To complicate the problem, it is inherent that the PRF's will have jitter to some degree and that they will be unsynchronized. Prior to this invention, the function of signal selection was accomplished by use of complex circuitry including error canceling servo feedback networks and variable period one shots.

Summary of the invention

This invention develops an output control voltage whenever the input pulse-to-pulse time interval maintains a desired level of correlation. As a result, the device essentially detects the presence of a single PRI which normally can be identified as originating from a specific emitting source. The principal timing device is a sawtooth generator which is reset every time a pulse is received. Detection of the peak voltage to which the generator charges, before being reset, gives an accurate indication of the PRI, since the sawtooth generator charges at the same rate every time. The detector also stores the peak voltage and when a plurality of input pulses having a PRI of equal duration is encountered, the circuit produces an output pulse. Since the ratio of time intervals is determined from one detector, calibration and tracking problems are minimized. It is a general object of this invention, therefore, to provide an improved and less complex method of selecting PRF's.

Brief description of the drawings

Other objects, advantages and novel features of the invention will become apparent from the following detailed description of the invention when considered in conjunction with the accompanying drawings, in which:

FIGURE 1 shows a block diagram of one embodiment of the invention;

FIGURES 2 and 3 show the sawtooth generator output voltage, from the generator portrayed in FIGURE 1, for two different PRF's;

FIGURE 4 is a schematic representation of the peak detector shown in FIGURE 1;

Description of the preferred embodiment

Figure 5:
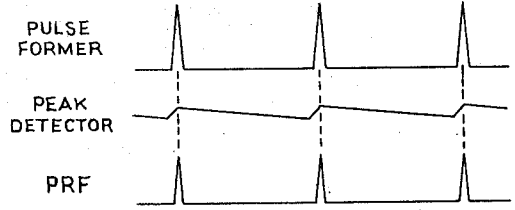
FIGURE 5 shows various waveforms that would be present in the circuit for a single PRF.

In the embodiment of the invention illustrated in FIGURE 1, all detected pulses are coupled as input signals to a one-shot multivibrator 10. Any conventional means may be utilized to receive these pulses from the atmosphere, and detect them for use in activating the one-shot. These pulses may be generated by various sources but the one-shot multivibrator converts them all to pulses of identical amplitude and width. The output of the one-shot 10 is coupled to the input of a sawtooth generator 11. The signal acts as a reset pulse to the sawtooth generator which is of the monostable variety. The sawtooth voltage is dropped to zero and held there for the duration of the one-shot pulse. When the pulse is removed the sawtooth generator begins its rate of rise and continues until another signal is received and processed through to the one-shot to again drop the voltage to zero. It is seen that if only one PRF is present, then the sawtooth generator will charge to the same voltage between every pulse.

FIGURES 2 and 3 illustrate the time relationship between the one-shot output, and the sawtooth waveform, when only a single waveform is present. It is seen that both views show the same rate of rise but in FIGURE 2 the PRF is higher and the time between pulses is therefore less than in FIGURE 3. Consequently, the sawtooth waveform charges to a higher voltage in FIGURE 3.

FIGURE 4 illustrates a simple version of a peak detector, two of which are shown in FIGURE 1 as blocks 12 and 13 of the block diagram. The inputs of the two peak detectors are coupled to the output of the sawtooth generator 11. The peak detector circuit allows the sawtooth wave to charge the capacitor 20 but when the sawtooth generator is reset to zero the capacitor 20 cannot discharge since the diode 21 is present. The only discharge path for the capacitor 20 is through the high resistance 22. One peak detector 12 is used to provide an analog voltage in proportion to the received PRF for utilization in other sections of a radar system, such as a voltage comparator 19. That is, the detector will charge up to the peak value of the sawtooth waveform, which peak value is directly proportional to the period between pulses of the received PRF. A charging current passes through the detector capacitor whenever the peak voltage of the sawtooth exceeds the capacitor voltage.

FIGURE 5 shows the peak detector output for one PRF input. The steep rate of rise corresponds to the short time that the capacitor is charging while the sawtooth waveform is rising, and the slope down and to the right corresponds to the capacitor 20 discharge through the high resistance 22. The discharge path is provided so that the detector output is a more accurate indication of the PRF. That is, if the PRF that is causing the analog voltage were to fade out, the detector voltage would decay allowing it to take a new and lower value if necessary. The circuit will inherently detect a higher peak voltage instantaneously but a time delay is involved if the peak voltage decreases.

Figure 6:
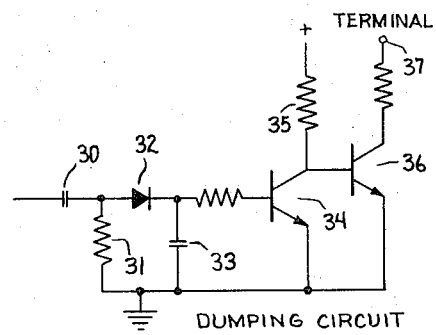
FIGURE 6 is a schematic representation of the dumping circuit shown in FIGURE 1.

The output of the second detector 13 is coupled through an amplifier 14 to a pulse forming circuit 15. This produces a sharp pulse every time the capacitor 20 in the peak detector receives a charging current. The time relation is shown in FIGURE 5. The amplifier may not be necessary if the detector pulse is large enough. The sharp pulse from the pulse forming circuit is coupled to a second one-shot multivibrator 16, and the output of this circuit 16 is designated the correlation signal. The correlation signal feeds two circuits, one of which is the dumping circuit 17. One version of this circuit is shown in FIGURE 6 where capacitor 30 and resistor 31 differentiate the one-shot pulse which is then coupled through a diode 32 to charge the capacitor 33. This keeps a bias on the base of a transistor 34 causing current to flow through the transistor 34 and causing a voltage to be dropped across resistor 35 so that a low voltage is seen by the base of a transistor 36. The dumping circuit 17 is designed so that if a pulse is not received from the one-shot 16 within a certain length of time the capacitor 33 will discharge to the point that current will decrease in transistor 34 so that the voltage to the base of transistor 36 will increase. The output terminal 37 on the dumping circuit is coupled to the outputs of both peak detector circuits and therefore an increase in voltage at the base of transistor 36 will cause the peak detector capacitors 20 to discharge. Care must be taken not to design the dumping circuit so as to render the invention insensitive to low PRF's. That is, the delay must be long enough to account for the relatively long period between the pulses of a low PRF signal.

Th output of one-shot multivibrator 10 is also coupled to a summing integrator 18, which may be of the type shown in a publication entitled Applications Manual for Philbrick Octal Plug-in Computing Amplifiers, by George A. Philbrick Researches, Inc., at page 12, item 1.9 "Summing Integrator" (Inverting), copyrighted in 1956, 10th printing, 1963. The correlation signal 16 is applied to the summing integrator 18 as the second input, and this circuit produces an output after integrating the input pulses only when there is correlation in the form of coincidence between consecutive respective pulses of the two input signal channels over a period of time determined by the time constant of integrator 18. This time constant is adjustable and should be sufficiently long, so that several consecutive pulse coincidences must occur before the summed and integrated signal therefrom exceeds an adjustable preset threshold in the operational amplifier of integrator 18, thereby enabling it to provide a D.C. level output correlation signal. A suitable time constant for integrator 18 might range from 20 to 100 milliseconds.

The analog voltage output from the peak detector 12 may be coupled to a voltage comparator circuit 19. This voltage comparator circuit 19 will compare the analog voltage with a fixed reference voltage whose amplitude is proportional to a specific PRF. The output of the voltage comparator 19 can then be used as a gate to permit the operation of other system functions, such as a video display, only when the specific PRF is present.

Figure 7:
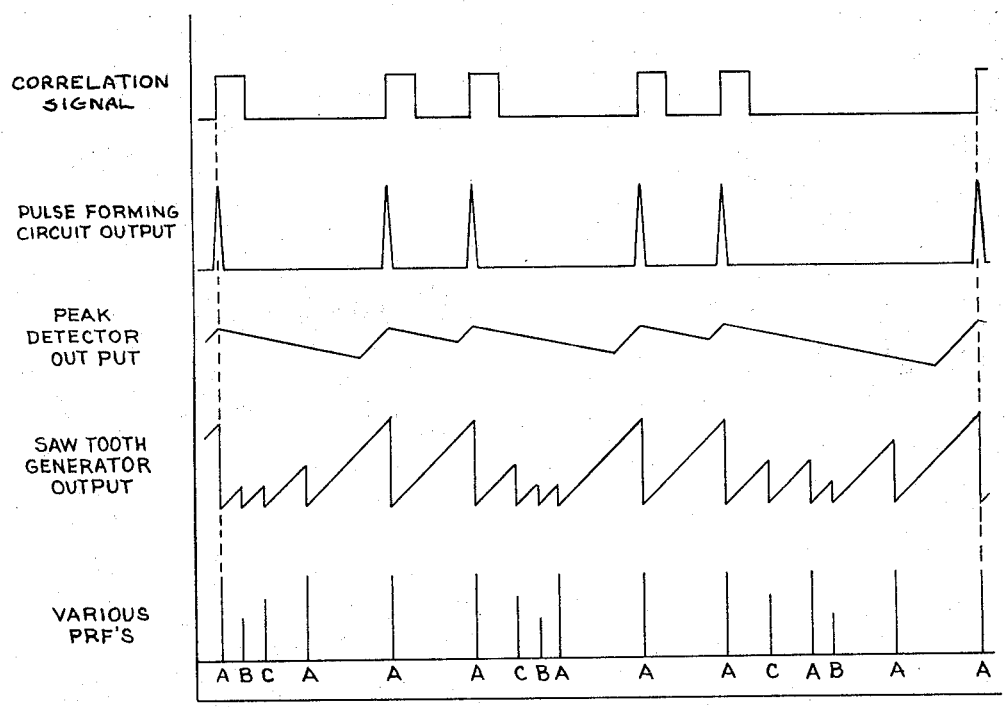
FIGURE 7 shows all the circuit waveforms for a multisignal input.

FIGURE 7 illustrates several PRF signals and the resultant waveforms throughout the circuitry. It can be seen from this drawing that correlation signals are produced only in response to a pulse train received from the source emitting the highest PRF in the area. This is true since this pulse train will cause the sawtooth generator to charge for the longest time even through it has the shortest period of all the various pulse trains being received. This fact becomes clear upon study of the waveforms in FIGURE 7.

The invention can compensate for jitter of the incoming PRF because of the discharge path in the peak detector 13. By choosing the proper value for the high resistance 22, the discharge can be set at 20% of the charge rate of the sawtooth generator and therefore the circuit will function properly even if the PRF has a 20% jitter. The summing integrator output may be used by a receiving system to initiate a gate which can be used to enable any function in the receiving system such as the video circuits. In that cause the video display would only indicate data having the desired PRF purity. As another illustration of the usefulness of this invention; if the output is used to gate audio circuits then a single frequency tone will be produced at random intervals whereas without this invention, the garbled result would be useless.

It will be understood that various changes in the details, which have been herein described and illustrated in order to explain the nature of the invention, may be made by those skilled in the art within the principle and scope of the invention, and we desire to be limited only in the scope of the appended claims.

What is claimed is:

1. A means for detecting a single radar pulse repetition frequency from a multisignal environment, comprising:
    a first one-shot multivibrator having an input for receiving pulses from the multisignal environment, said first one-shot multivibrator for furnishing a standard pulse regardless of the amplitude and width of the input pulse;
    a sawtooth generator having its input coupled to the output of said first one-shot multivibrator, the pulses from said first one-shot causing said sawtooth generator to reset;
    a peak detector means having an input thereof coupled to the output of said sawtooth generator, said peak detector means for detecting and storing the peak voltage to which said sawtooth generator charges and then discharging the stored value slightly so that a small pulse is generated when the next sawtooth generator peak voltage is reached which is as high as the first said peak voltage;
    a pulse forming circuit having its input coupled to receive the output of said peak detector means for converting said small pulse from said peak detector means into a sharp pulse;
    a second one-shot multivibrator having its input coupled to the output of said pulse forming circuit, said second one-shot for producing an output pulse for each of said peak detector means pulses; and
    a summing integrator circuit having a first and a second input, said first input coupled to the output of said first one-shot and said second input coupled to the output of said second one-shot, said summing integrator circuit for integrating said input pulses and producing an output pulse when a predetermined correlation level has been attained.

2. A means for detecting a single radar pulse repetition frequency from a multisignal environment as described in claim 1 wherein
    said peak detector means is comprised of two peak detectors having the same input, one of said peak detectors furnishing said small pulses to said pulse forming circuit, and the second of said peak detectors for detecting and storing the peak voltage of said sawtooth generator thereby providing an analog voltage output which is proportional to the highest pulse repetition frequency being received.

3. A means for detecting a single radar pulse repetition frequency from a multisignal environment, comprising:
    a first one-shot multivibrator having an input for receiving pulses from the multisignal environment, said first one-shot multivibrator for furnishing a standard pulse regardless of the amplitude and width of the input pulse;

a sawtooth generator having its input coupled to the output of said first one-shot multivibrator, the pulses from said first one-shot causing said sawtooth generator to reset;

a first peak detector means having its input coupled to the output of said sawtooth generator, said first peak detector means for detecting and storing the peak voltage to which said sawtooth generator charges and then discharging the stored value slightly so that a small pulse is generated when the next sawtooth generator peak is reached which is as high as the first of said peaks;

a second peak detector means having its input coupled to the output of said sawtooth generator, said second peak detector means for detecting and storing the peak voltage of said sawtooth generator thereby providing an analog voltage output which is proportional to the highest pulse repetition frequency being received;

a voltage comparator having a first input coupled to said analog voltage output of said second peak detector means and having a second input coupled to a reference voltage, said voltage comparator for providing an output only when said two input voltages are equal, thereby providing for the detection of a specific PRF;

an amplifier having its input coupled to the output of said first peak detector means, for amplifying the output signal from said first peak detector means;

a pulse forming circuit having its input coupled to the output of said amplifier;

a second one-shot multivibrator having its input coupled to the output of said pulse forming circuit, said second one-shot for producing an output pulse for each of said first peak detector means pulses;

a dumping circuit means having its input coupled to the output of said second one-shot multivibrator and having its output coupled to the output of both said peak detector means, said dumping circuit means for discharging said peak detector means when said second one-shot does not produce an output pulse within a certain predetermined time, thereby permitting said peak detector means to seek a new peak voltage when a pulse repetition frequency fades out or when a higher pulse repetition frequency fades in; and a summing integrator circuit having a first and a second input, said first input coupled to the output of said first one-shot and said second input coupled to the output of said second one-shot, said summing integrator circuit for integrating said input pulses and producing an output pulse when a predetermined correlation level has been attained, whereby said summing integrator circuit output and said voltage comparator output may co-operate in gating a video display.

No references cited.

RODNEY D. BENNETT, *Primary Examiner.*

C. L. WHITHAM, *Assistant Examiner.*